United States Patent [19]
Ikushima et al.

[11] Patent Number: 6,088,825
[45] Date of Patent: Jul. 11, 2000

[54] ERROR CORRECTING APPARATUS WITH ERROR CORRECTION UNIT CARRYING OUT FIRST ERROR CORRECTION AND CPU CONFIGURED TO CARRY OUT SECOND ERROR CORRECTION

[75] Inventors: Makoto Ikushima; Shinji Otsuka, both of Yokohama; Hirofumi Tsujimura, Chigasaki; Tamotsu Ito, Ayase, all of Japan

[73] Assignee: Hitachi, Ltd., Tokyo, Japan

[21] Appl. No.: 09/066,911

[22] Filed: Apr. 28, 1998

Related U.S. Application Data

[63] Continuation of application No. 08/539,884, Oct. 6, 1995, Pat. No. 5,768,502.

[30] Foreign Application Priority Data

Oct. 7, 1994 [JP] Japan .................................. 6-243668

[51] Int. Cl.⁷ .................................................. G11B 20/18
[52] U.S. Cl. ................................................... 714/769
[58] Field of Search ............................................. 714/769

[56] References Cited

U.S. PATENT DOCUMENTS

| | | | |
|---|---|---|---|
| 4,604,750 | 8/1986 | Manton et al. | 371/38 |
| 4,866,717 | 9/1989 | Murai et al. | 371/40.3 |
| 4,949,342 | 8/1990 | Shimbo et al. | 371/40.1 |
| 5,038,275 | 8/1991 | Dujari | 364/200 |
| 5,058,116 | 10/1991 | Chao | 371/40.2 |
| 5,164,944 | 11/1992 | Benton et al. | 371/40.1 |
| 5,239,636 | 8/1993 | Dujari et al. | 364/238.3 |
| 5,335,215 | 8/1994 | Yoshiyama | 369/50 |
| 5,410,554 | 4/1995 | Watanabe | 371/40.1 |
| 5,432,801 | 7/1995 | Hepler | 371/40.1 |
| 5,499,252 | 3/1996 | Watanabe | 371/40.1 |
| 5,509,119 | 4/1996 | La Fetra | 395/185.05 |
| 5,535,327 | 7/1996 | Verinsky | 395/182.03 |
| 5,548,599 | 8/1996 | Furuhashi et al. | 371/40.1 |
| 5,602,857 | 2/1997 | Zook et al. | 371/40.1 |
| 5,630,055 | 5/1997 | Bannon | 395/185.05 |
| 5,768,502 | 6/1998 | Ikushima et al. | 395/185.07 |

FOREIGN PATENT DOCUMENTS

| | | |
|---|---|---|
| 4015755A1 | 11/1990 | Germany . |
| 5-21883 | 8/1993 | Japan . |
| 8017147 | 1/1996 | Japan . |
| WO89/02123 | 3/1989 | WIPO . |

OTHER PUBLICATIONS

Electronic Components and Applications, vol. 4, No. 3, May 1982 "Ics for Compact Disc decoders".

"Error Correction Implementation and Performance in a CD–ROM Drive", Hewlett–Packard Journal, Dec. 1, 1990, vol. 41, No. 6, pp. 42–48.

*Primary Examiner*—Stephen M. Baker
*Attorney, Agent, or Firm*—Antonelli, Terry, Stout & Kraus, LLP

[57] ABSTRACT

There is disclosed an error correcting apparatus comprising a storage medium read control section for reading out a data set from an optical disk such as a CD-ROM which stores therein at least one data set consisting of data of a predetermined length and error correcting codes for correcting errors within the data, and for detecting whether or not the data set read out from the optical disk contains one or more errors, a temporary buffer connected to the storage medium read control section for temporarily storing the data obtained by the storage medium read control section, a central processing section connected to the storage medium read control section and the temporary buffer for controlling them and for carrying out error correction with respect to the data set stored in the temporary buffer. The central processing section is configured to cause the data set to be transferred from the storage medium read control means to the temporary buffer, and, in the course of this transfer, to determine whether or not another data set already stored in the temporary buffer contains one or more errors based on a result produced by the storage medium read control section and carry out the error correction with respect to the earlier-stored data set if it contains one or more errors.

14 Claims, 8 Drawing Sheets

ERROR CORRECTING APPARATUS WITH ERROR CORRECTION UNIT CARRYING OUT FIRST ERROR CORRECTION AND CPU CONFIGURED TO CARRY OUT SECOND ERROR CORRECTION

This application is a continuation of application Ser. No. 08/539,884, filed Oct. 6, 1995, now U.S. Pat. No. 5,768,502.

TECHNICAL FIELD

This invention relates to an error correcting apparatus which reads data recorded on an information storage medium, detects errors within the data read out therefrom and corrects them so as to obtain proper data.

BACKGROUND ART

In the art of information processing, efforts are being made to increase the density of the processing for reading out information from an information storage medium, the transfer speed, and the like. When information is subjected high-density and high-speed processing, it is important to ensure the reliability of the information. There is a well-known error correcting technique using error correcting codes in order to increase the reliability of information.

In this technique, information data and other predetermined data for correcting errors within the former (hereinafter referred to as "error detection code(s)") are recorded in the information storage medium in advance.

When the information recorded on the information storage medium is to be reproduced, the data and the error correcting codes read out from the storage medium are processed in a predetermined manner so as to detect the position of any error within the read-out data and obtain information for correct the datum at the error position. An apparatus for correcting errors within the data obtained by the above mentioned processing, namely, for decoding, is referred to as an error correcting apparatus.

An error correcting apparatus provided in a system for reading information recorded on a compact disc read only memory (CD-ROM: developed by Sony Corporation and Phillips Consumer Electronics B.V. and standardized in 1985), which is a type of optical disk, carries out two methods of error correction.

The first error correction which is used for correcting information recorded on a music compact disk (CD) uses the Cross Interleave Reed Solomon Code (CIRC). The error correction using the CIRC includes two stages of error correction, one of which is called C1 correction and the other of which is called C2 correction.

In the step of encoding, error correcting codes of 4 bytes used for the C1 correction and those of 4 bytes used for the C2 correction are added to data of 24 bytes to be recorded on the CD-ROM. The C1 correction is carried out with respect to the data of 24 bytes, while the C2 correction is carried out with respect to data of 28 bytes consisting of the data of 24 bytes and the error correcting codes for the C1 correction of 4 bytes.

In the error correction of the CD-ROM, in order to improve the reliability of the information, Layered Error Corrected Code (LECC) is used as the second error correction. The data recorded on the CD-ROM in mode 1 are managed in logical data units of a predetermined length called sectors. One sector is constituted of 12 bytes of synchronization data, 4 bytes of header data, 2048 bytes of subsequent user data, and 288 bytes of auxiliary data. The auxiliary data consists of 4 bytes of error detecting codes (EDC) other than the LECC, 8 bytes of zero data, 172 bytes of error correcting codes for error correction by a parity P based on the LECC, and 104 bytes of error correcting codes for error correction by a parity Q based thereon.

In the second error correction, a calculation using the EDC is carried out with respect to the 2068 bytes of data from the header data to the EDC. further, in the error correction using the LECC, two stages of error correction are carried out. The error correction by the parity P is carried out with respect to the 2336 bytes of data from the header data to the error correcting codes for the parity P, while the error correction by the parity Q is carried out with respect to the 2340 bytes of data from the header data to the error correcting codes for the parity Q.

In the error correction using the LECC, error data are detected and corrected every byte. The number of correctable error data can be increased by repeating the error correction by parities P and Q one after another. In other words, the error correction capability can be increased by increasing the repetition number of the error correction by parities P and Q.

Since the above mentioned calculation concerning the error correcting codes is complicated, the error correcting apparatus is generally constituted by a dedicated hardware circuit which can operate at a high speed to complete the calculation within a predetermined time period. However, the configuration of a hardware circuit which can operate at a high speed is complicated, which makes it large and costly. The time required to carry out the error correction increases as the error correction capability is increased, while the structure of the circuit becomes more complicated as the processing time is reduced.

When the information recorded on the CD-ROM is reproduced, the probability of random errors other than those due to blemishes on the CD-ROM is approximately the minus 6th to minus 4th power of ten ($10^{-6}$–$10^{-4}$) in terms of byte error rate.

Further, even if the uncorrected data contain no errors, the conventional error correcting apparatus using the hardware circuit carries out the calculation concerning the error correcting codes of the data or the like. Accordingly, it is difficult to reduce the processing time.

In view of the above, Japanese Patent Application Laid Open (KOKAI) No. 5-218883 discloses an error correcting apparatus which, for reducing the processing time, first of all detects errors within the uncorrected data using an algorithm whose calculation is easy, then carries out the error correction using the LECC or the like only if an error exists. The error correcting apparatus comprises error correcting means for receiving uncorrected data and error correcting codes and for correcting errors within the received data, mis-correction detecting means for receiving the result generated by the error correcting means and for detecting mis-correction therein, storage means for storing the uncorrected data, error detecting means for detecting errors within the uncorrected data, and select means for selecting either the output of the mis-correction detecting means or that of the storage means based on the result of the error detecting means and outputs selected one as corrected data.

In this apparatus, the error detecting means determines whether or not errors exist in the uncorrected data, and if it is determined that no error exists, the select means outputs as the corrected data the uncorrected data stored in the storage means. In accordance with this apparatus, the processing time can be reduced if the uncorrected data contain no errors. Alternatively, if the uncorrected data contain errors, since the error correction is carried out by the error correcting means, it takes substantially the same time as the processing time required to obtained the corrected data by the conventional error correcting apparatus.

However, the above mentioned error correcting apparatus has certain disadvantages.

For example, when the information recorded on the CD-ROM is reproduced, generally it is continuously read at the rate of 1 sector per 13.3 millisecond. Since the above-mentioned error correcting apparatus cannot read the uncorrected data therein during the period of the error correction, the error correction has to be completed within 13.3 milliseconds at the longest.

If the time required to correct errors within the data of one sector (the sector data set) is greater than the time required to read the information corresponding to a subsequent sector data set, the CD-ROM drive apparatus has to suspend reading of the information recorded on the CD-ROM, and after the error correction is completed, has to initiate reading of the information recorded on the CD-ROM again. Actually, when the CD-ROM drive apparatus suspends reading of the information, it continues to rotate the CD-ROM (in pause status).

However, when the status of the CD-ROM drive apparatus changes from pause to reproduction, a period of time is required for accurately directing a light beam from an optical pickup onto a target track of the CD-ROM, moving the optical pickup into the vicinity of the target track, or the like. Accordingly, a time loss occurs relative to the continuous reading of the information. As a result, it is impossible to reduce the processing time.

In addition, the above problem may also occur if the information is read out from the CD-ROM at a higher speed, such as a double speed or a triple speed, or the error correcting capability is increased to enhance the reliability of the information. It may be possible to solve this problem by using an error detecting circuit operating at a higher speed and having higher error correcting capability. However, it is difficult to design such an error detecting circuit without increasing circuit size and cost.

The above mentioned problem may also occur when information is read out from types of disks other than the CD-ROM, such as optical disks.

The object of the present invention is to provide an error correcting apparatus which can carry out the error correction without suspending reading of the information recorded on the CD-ROM.

SUMMARY OF THE INVENTION

The above and other objects of the invention are accomplished by an error detecting apparatus comprising storage medium read control means for reading out a data set from an information storage medium which stores therein at least one data set consisting of data of a predetermined length and error correcting codes used for correcting errors within the data, and for detecting whether or not the data set read out from the information storage medium contains one or more errors, storage means connected to the storage medium read control means for temporarily storing the data obtained by the storage medium read control means, central processing means connected to the storage medium read control means and the storage means for controlling them and for carrying out error correction with respect to the data set stored in the storage means, said central processing means being configured to cause said data set to be transferred from said storage medium read control means to said storage means, and, in the course of this transfer, to determine whether or not another data set already stored in said storage means contains one or more errors based on a result produced by said storage medium read control means and carry out the error correction with respect to the earlier-stored data set if it contains one or more errors.

According to the present invention, since the central processing means carries out the error correction with respect to the data set only when the data set contains one or more errors, it is possible to promptly obtain the proper data set.

In a preferred aspect of the present invention, said central processing means includes a direct memory access controller which causes the data set to be transferred from said storage medium read control means to said storage means.

In another preferred aspect of the present invention, said central processing means is configured to set an error flag corresponding to the data set based on the result obtained by said storage medium read control means in response to completion of the transfer of the data set.

In another preferred aspect of the present invention, said apparatus further comprises a second storage means for storing data sets after the error correction by said central processing means or data sets not subjected to the error correction by the central processing means because they contain no error.

In another preferred aspect of the present invention, the central processing means includes a memory management table for managing a memory space including addressees of said first storage means and those of said second storage means, and is arranged to update said memory management table in such manner that the assignment of areas for storing data sets not subjected to the error correction by the central processing means is changed from said first storage means to said second storage means. Thus, it is possible to promptly transfer a data set stored in the first storage means into the second storage means.

In another preferred aspect of the present invention, said storage medium read control means is configured to carry out first error correction with respect to the data set read out from the information storage medium, and the central processing means is arranged to carry out second error correction other than the first error correction.

In another preferred aspect of the present invention, said first error correction uses CIRC, and said second error correction uses LECC.

In another preferred aspect of the present invention, said central processing means is configured to, when the error correction is to be carried out, repeat said second error correction a predetermined number of times until the data set contains no error.

In another preferred aspect of the present invention, the apparatus further comprises second error correcting means connected to said storage medium read control means for preliminarily carrying out the second error correction with respect to a data set provided by said storage medium read control means, a time required to complete the preliminary second error correction by said second error correcting means being less than a time required to obtain a data set from the information storage medium by said storage medium read control means.

According to this aspect of the present invention, since the second error correcting means preliminarily carries out the second error correction, it is possible to reduce the number of error corrections by the central processing unit. As a result, it is possible to obtain proper data sets more promptly.

In another aspect of the present invention, an apparatus for employing information from a storage medium comprises storage medium read control means for reading out a data set from an information storage medium which stores therein at least one data set consisting of data of a predetermined length and error correcting codes for correcting errors within the data, and for detecting whether or not the data set read out from the information storage medium contains one or more errors, storage means connected to the storage medium read control means for temporarily storing the data obtained by the storage medium read control means, central processing means connected to the storage medium read control means and the storage means for controlling them and for carrying out error correction with respect to the data set stored in the storage means, second storage means connected to the central processing means for storing data sets obtained by the central processing means, and an external interface connected to the central processing means and the second storage means and connectable to an external system, wherein one or more predetermined data set stored in the second storage means are transferred via the external interface to the external system, said central processing means being configured to cause said data set to be transferred from said storage medium read control means to said storage means, and, in the course of this transfer, to determine whether or not another data set already stored in said storage means contains one or more errors based on a result produced by said storage medium read control means and carry out the error correction with respect to the earlier-stored data set if it contains one or more errors.

In a further preferred aspect of the present invention, when said external interface is supplied with a request which indicates that one or more predetermined data sets are transferred to the external system, said central processing means instructs to cause said storage medium read control means to read said predetermined data sets in response to the request.

DESCRIPTION OF THE PREFERRED EMBODIMENTS

Figure 1:
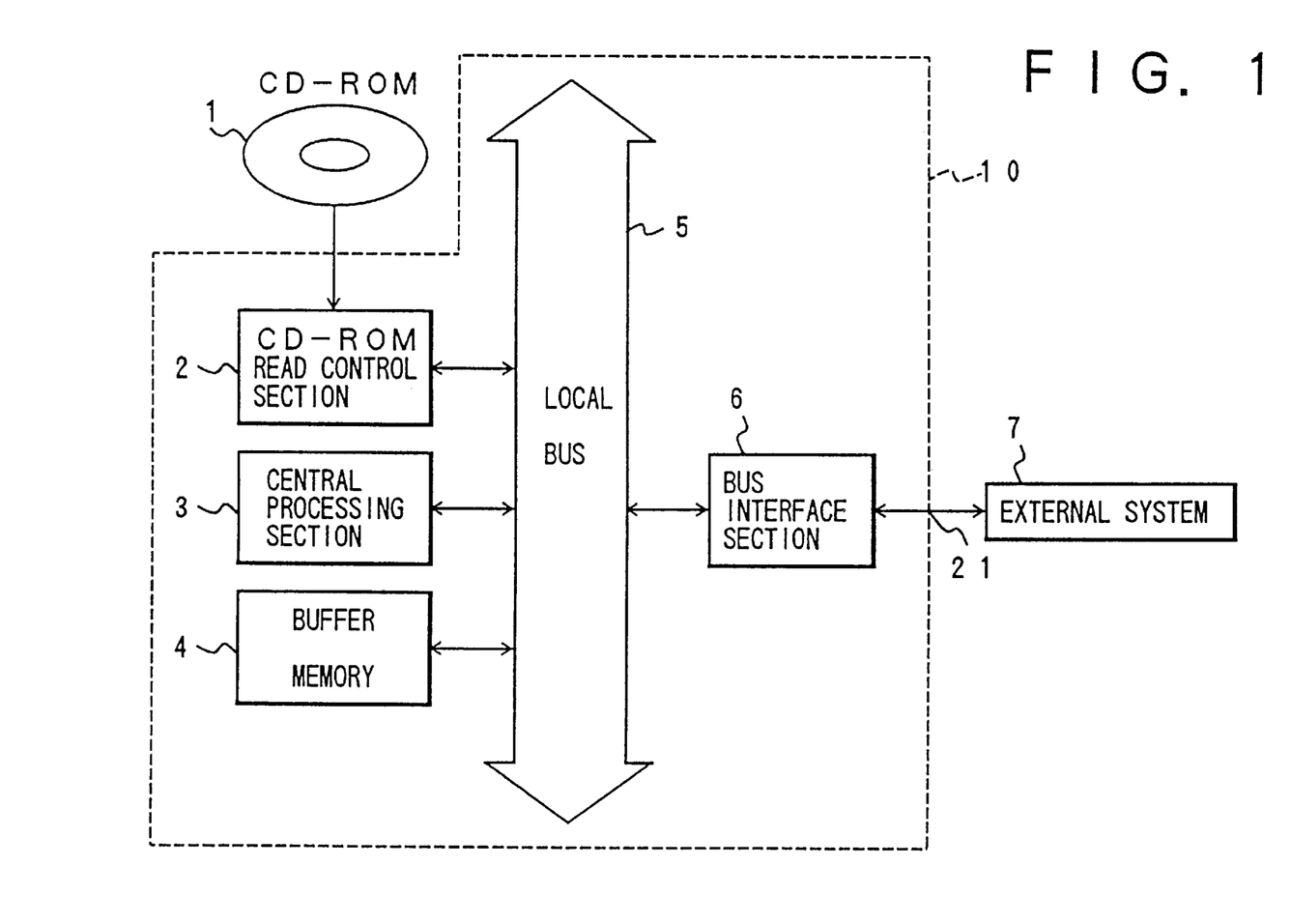
FIG. 1 is a schematic block diagram of a CD-ROM drive apparatus which is a first embodiment of the present invention and an external system.

As shown in FIG. 1, a compact disc read only memory (CD-ROM) drive apparatus 10 which is an embodiment of the present invention comprises a CD-ROM read control section 2 for reading information recorded on a CD-ROM 1, a central processing section 3 for processing data obtained by the CD-ROM read control section 2, and the like, a buffer memory 4 for storing the data obtained by the CD-ROM read control section 2, and a bus interface section 6 connected to a system 7 located outside of the CD-ROM drive apparatus 10. The components in the CD-ROM drive apparatus 10 are connected to each other by a local bus 5.

A plurality of data sets (sectors), each including data of a predetermined length and error correcting codes used for correcting errors within the data, are recorded on the CD-ROM in advance. More specifically, as mentioned above, the data of one sector (herein after referred to as "a sector data set") includes 12 bytes of synchronization data, 4 bytes of header data, 2048 bytes of user data and 288 bytes of auxiliary data.

The CD-ROM read control section 2 includes an optical pickup (not shown), a pickup drive device (not shown) for driving the optical pickup, and a control circuit (not shown) for transforming optical signals into electrical signals so as to obtain desired data.

The central processing section 3 is constituted using a SH7034 microcomputer manufactured by Hitachi, Ltd. This microcomputer comprises a RISC type central processing unit (CPU) and necessary peripheral circuits including a 64 K byte read only memory (ROM), a 4 K byte random access memory, a direct memory access controller (DMAC), a timer, a serial communication interface (SCI), an analog-to-digital converter, an interrupt controller, an in/out (I/O) port and the like. It is operated by programs stored in the ROM.

The external system 7, for example, is a personal computer which uses the information recorded on the CD-ROM 1.

The general operation of the thus constructed CD-ROM drive apparatus will now be explained.

When a data transfer request is transferred from the external system 7 (e.g. a personal computer) via an external system bus 21 and the bus interface section 6 to the central processing section 3, the central processing section 3 supplies the CD-ROM read control section 2 with a predetermined instruction based on the provided data transfer request to obtain the desired data. The pickup drive device of the CD-ROM read control section 2 moves the optical pickup into the vicinity of the target track of the CD-ROM 1 in accordance with the supplied instruction. After the optical pickup reaches the vicinity thereof, a light beam from a light emitting element (not shown) provided in the optical pickup is directed onto the CD-ROM 1, and the light reflected from the CD-ROM 1 is received by a light receiving element (not shown). In accordance with the thus-obtained optical signals from the optical pickup, the control circuit obtains sector data sets corresponding to the requested sectors. In the CD-ROM drive apparatus 10 of this embodiment, it takes approximately 6.7 milliseconds to read the information corresponding to one sector data set. In other words, the CD-ROM drive apparatus is arranged to read the information recorded on the CD-ROM 1 at double the standard speed. As a matter of course, the CD-ROM drive apparatus may read the information recorded thereon at the standard speed, namely, it may take 13.3 milliseconds to read the information corresponding to one sector data set. Alternatively, the CD-ROM drive apparatus may read it at another speed such as triple speed.

Under the control of the central processing section 3, the CD-ROM read control section 2 carries out error correction using CIRC and error detection using EDC with respect to the obtained data. When this processing is completed, the processed data are transferred via the local bus 5 to the buffer memory 4, and are stored in predetermined areas thereof. On the other hand, the central processing section 3 carries out error correction using LECC with respect to the data stored in the predetermined areas of the buffer memory 4, if the errors remain after the error correction using the CIRC, or other errors occur owing to the error correction using the CIRC and these errors are detected by the error detection using the EDC. The central processing section 3 stores the obtained data in other predetermined areas of the buffer memory 4. The data stored in the other predetermined areas thereof are supplied via the local bus 5 to the bus interface section 6 under the control of the central processing section 3. Further the data in the bus interface section 6 are transferred to the external system 7 via the external system bus 21.

In addition, the central processing section 3 conduct other operations such as storing the data obtained by the CD-ROM read control section 2 in the predetermined areas of the buffer memory 4, reading the sector data set stored in other predetermined areas of the buffer memory 4 to correct errors within the data set and transferring the sector data set via the local bus 5 to the bus interface section 6, and other processing required to operate the CD-ROM drive apparatus.

The processing from the time when the central processing section 3 supplies the CD-ROM read control section 2 with an instruction to read from the CD-ROM 1 the information corresponding to sector data sets of predetermined sectors to the time when the sector data sets are stored in a temporary buffer of the buffer memory 4 will now be explained with reference to FIG. 2.

When the processing is initiated (step 201), the central processing section 2 determines whether or not one or more areas in the buffer memory 4 can be secured as a temporary buffer for temporarily storing a sector data set obtained by the CD-ROM read control section 2 (step 202).

If the step 202 finds that no area for temporarily storing the sector data set is available in the buffer memory 4, the processing proceeds to the step 203. On the contrary, if the areas are found, they are ensured for the temporary buffer.

In the step 203, the central processing section 3 supplies the CD-ROM read control section 2 with an instruction to maintain the position of the optical pickup.

On the other hand, in the step 204, the central processing section 3 determines whether or not the optical pickup of the CD-ROM read control section 2 has reached the vicinity of the target track and has read information recorded on the predetermined position of the CD-ROM 1. If the result is "Yes" in the step 204, the processing proceeds to the step 206, while if "No," the central processing section 3 supplies the CD-ROM read control section 2 with an instruction to initiate reading of information recorded on the CD-ROM 1 (step 205).

Next, the central processing section 3 gives predetermined information to the built-in DMAC so as to transfer to the temporary buffer the sector data set processed in the CD-ROM read control section 2 by, for example, error correction using the CIRC and error detection using the EDC (step 206). The information given to the DMAC includes the source (the CD-ROM read control section), the destination (addresses of the temporary buffer), and the number of data to be transferred (size of one sector data set).

The central processing section 3 determines whether or not the sector data set is transferred to the temporary buffer provided in the buffer memory 4 and is stored therein by the DMAC (step 207). More specifically, this step is accomplished by the DMAC sending a transfer completion flag to the CPU of the central processing section 3. If the transfer of the sector data set is not finished, the processing returns to the step 207, while if the transfer is finished, it proceeds to the step 208.

After the sector data set is stored in the temporary buffer of the buffer memory 4 by the DMAC built in the central processing section 3, the central processing section 3 determines whether or not the data set is associated with the desired sector (step 208). If the result is "No" in the step 208, the central processing section 3 frees the temporary buffer, and the processing returns to the step 206 so that another sector data set associated with another sector is read (step 209). On the contrary, if the result is "Yes" in the step 208, the central processing section 3 determines whether or not the sector data set contains any errors based on the result of the error detection using the EDC carried out by the CD-ROM read control section 2 (step 210).

Figure 4A:
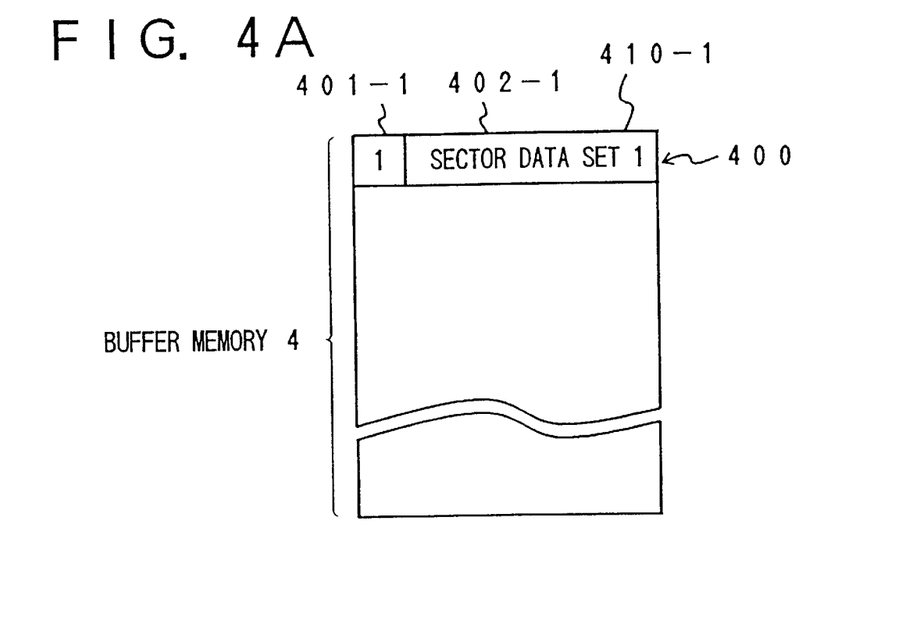
FIGS. 4A to 4D show a temporary buffer and a specified memory area in a buffer memory.

If the step 210 find that the data set contains errors, an error flag associated with the data set is set (step 211). FIG. 4A shows an example of the contents of the temporary buffer. As shown in FIG. 4A, an error flag corresponds to one sector data set. The temporary buffer 400 is formed with a data set 410-1 consisting of an error flag 401-1 and a sector data set 4021.

Next, the central processing section 3 determines whether or not the sector data sets of all sectors specified by the external system 7 have been obtained (step 212). If the result is "Yes" in the step 212, the central processing section 3 supplies the CD-ROM read control section 2 with an instruction to terminate the reading of information recorded on the CD-ROM 1 while maintaining the position of the optical pickup (step 213). On the other hand, if the result is "No" in the step 212, the processing returns to the step 202 to secure other space areas in the buffer memory 4 as the temporary buffer.

Figure 4B:
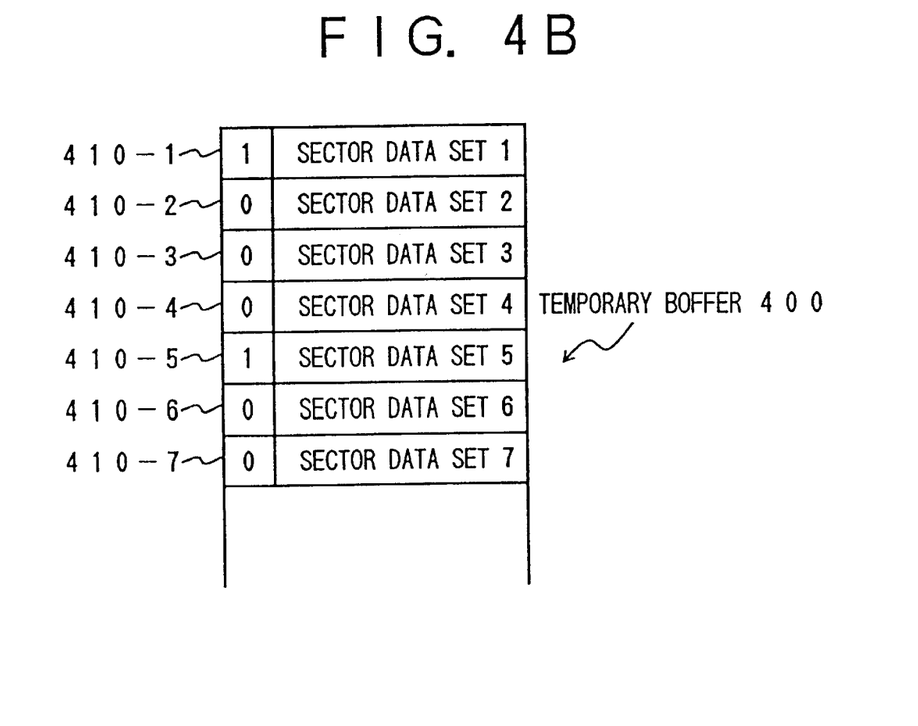

Thus, the sector data sets of predetermined sectors are stored in the temporary buffer of the buffer memory 4. FIG. 4B shows the sector data sets stored in the temporary buffer provided in the buffer memory 4 owing to the processing shown in FIG. 2. As shown in FIG. 4B, the temporary buffer 400 includes, in addition to the first data set 410-1 consisting of the error flag 401-1 and the sector data set 402-1, the second to seventh data sets 410-2 to 410-7.

Figure 3:
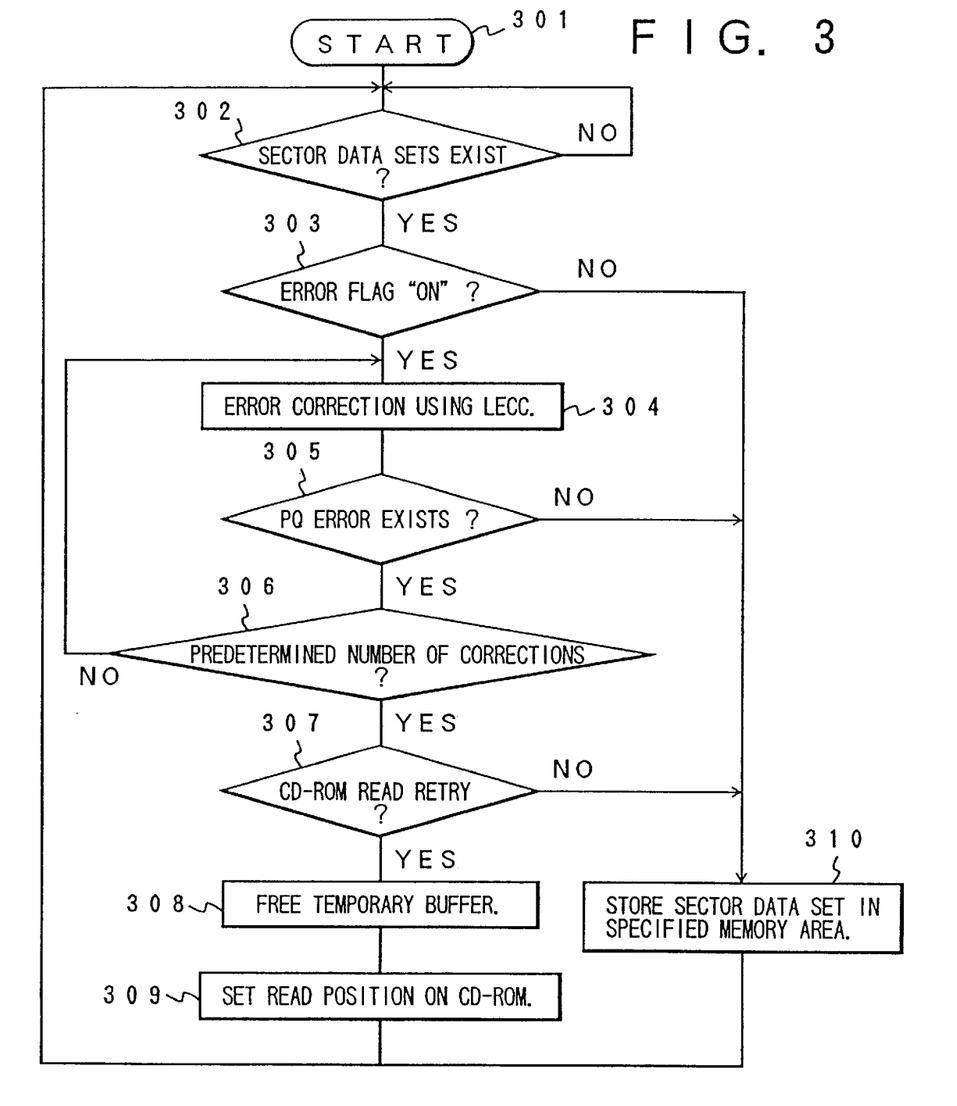
FIG. 3 is a flow chart showing how a central processing section carries out error correction with respect to a sector data set stored in a temporary buffer, and stores data after error correction or data stored in the temporary buffer in a specified memory area.

The central processing section 3 carries out the processing shown in FIG. 3 if at least one data set exists in the temporary buffer of the buffer memory 4, as when the DMAC has caused data to be transferred from the CD-ROM read control section 2 to the temporary buffer of the buffer memory 4 (see the steps 301, 302).

When the processing is initiated (step 301), the central processing section 3 determines whether or not the data set consisting of the error flag and the sector data set exist (step 302). If the result is "Yes" in the step 302, the central processing section 3 reads the data set positioned at the front of the temporary buffer and determines whether or not the error flag thereof is "1" or "ON" (step 303). On the other hand, if the result is "No" in the step 302, the step 302 is repeated. The data set positioned at the front is the earliest stored data set in the temporary buffer.

If the step 303 determines that the error flag is "0" or "OFF," the processing proceeds to the step 310, while if it determines that the error flag is "1" or "ON," the processing proceeds to the step 304.

In the step 304, the error correction using the LECC is carried out with respect to the data set in order of the error correction by the parities P and Q.

When the step 304 is completed, the central processing section 3 determines whether or not the data set after the error correction still contains any errors (step 305). If the data set contains any errors, the central processing section 3 further determines whether or not the number of error corrections has reached a predetermined number (step 306). If the number thereof has not reach the predetermined number, the processing returns to the step 304, while if it has reached the predetermined number, the processing proceeds to the step 307.

If the step 307 determines that the information recorded on the CD-ROM 1 is to be read again because the error correction cannot be completed even by the error correction using the LECC ("Yes" in the step 307), the processing proceeds to the step 308, otherwise it proceeds to the step 310.

If the result is "No" in the step 305, namely, if it is determined that the data set after the error correction using the LECC contains no error, the processing proceeds to the step 310.

If the result is "Yes" in the step 307, the central processing section 3 frees the temporary buffer to again read information recorded on the CD-ROM 1 (step 308), and again supplies the CD-ROM read control section 2 with the instruction to read the information recorded on the CD-ROM 1 (step 309).

On the contrary, if the result is "No" in the step 303, the sector data set read out from the temporary buffer in the step 303 is stored in other predetermined areas in the buffer memory 4 secured as a specified memory area (step 310). Alternatively, if "No" in the step 305, or in the step 307, the sector data set after the error correction is stored in the specified memory area (step 310). Thus, the areas in the temporary buffer of the buffer memory 4 which contains the data set concerning the processing are freed. As a result, the processing shown in FIG. 3 is carried out again with respect to the data set positioned second from the front.

Figure 2:
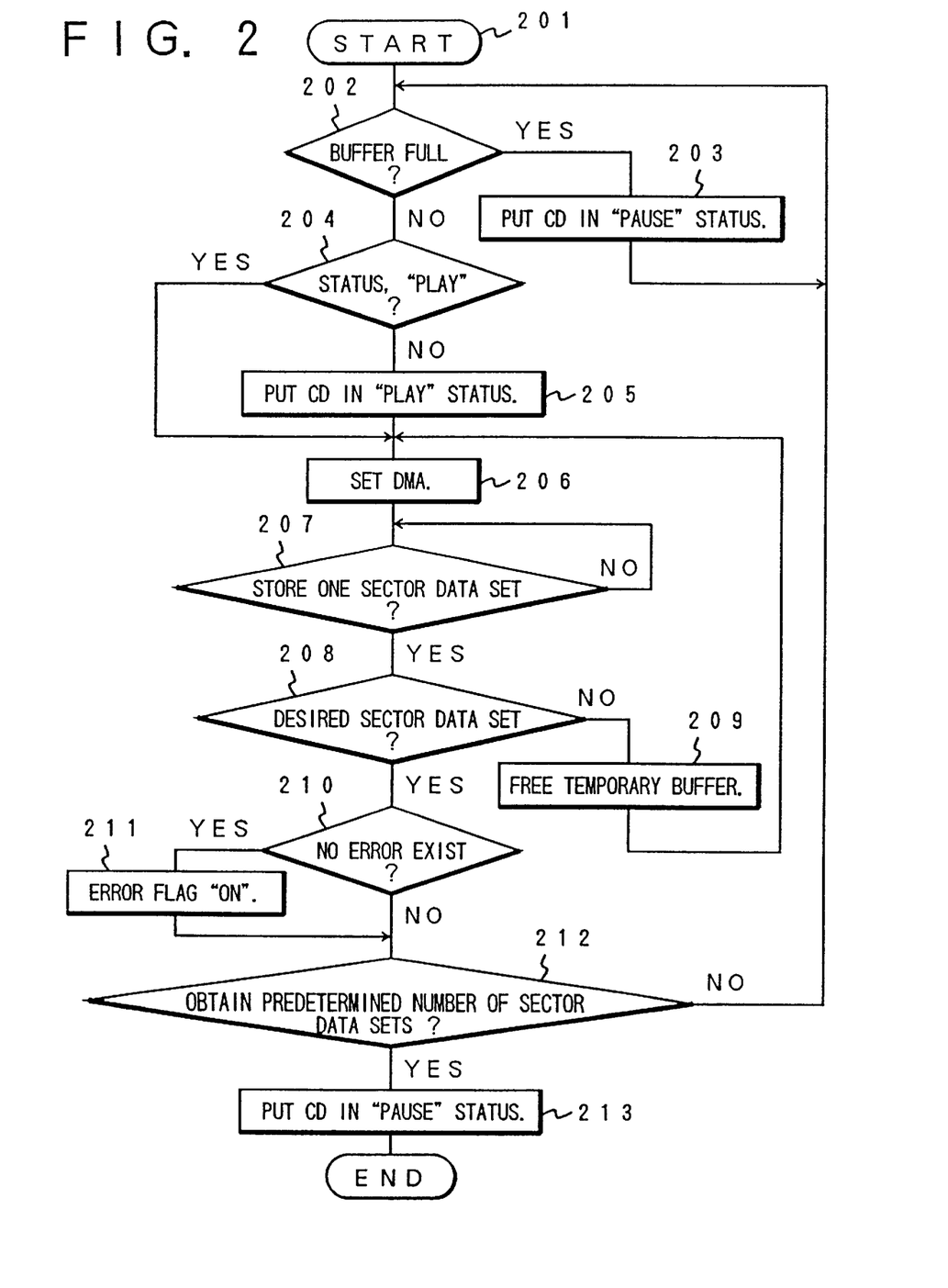
FIG. 2 is a flow chart showing how data obtained by a CD-ROM read control section are stored in a temporary buffer.

In this embodiment, the processing shown in FIG. 2 is carried out on an interrupt basis and is activated when an interrupt is applied to the CPU of the central processing section 3 during the execution period of the processing shown in FIG. 3. In FIG. 2, after giving the predetermined information to the DMAC, the CPU of the central processing section 3 enables the processing shown in FIG. 3. On the other hand, during the execution period of the processing shown in FIG. 3, and other processing for controlling the CD-ROM drive apparatus, the CPU of the central processing section 3 is interrupted by the transfer completion flag indicative of the completion of the transfer of the sector data set provided by the DMAC, whereby the processing from the step 208 on is carried out.

The processing shown in FIGS. 2 and 3 will now be explained again with reference to FIG. 4.

As previously mentioned in connection with FIG. 2, areas in the temporary buffer 4 are secured as the temporary buffer for storing at least one data set consisting of a sector data set and an error flag obtained by the CD-ROM read control section 2. Another areas therein are ensured for the specified memory area for storing at least one sector data set containing no error. In this embodiment, the buffer memory 4 is used for the above mentioned temporary buffer and the specified memory area. Other areas in the buffer memory are space areas.

Assume that after the first data set 410-1 is stored in the temporary buffer as shown in FIG. 4A, and the steps 301 to 303 are executed, the error correction using the LECC is carried out by the central processing section 3 (step 304).

Assume that at this time the second data set 410-2 to the seventh data set 410-7 are further stored in the temporary buffer owing to the operation of the DMAC, and the processing from steps 207 to 221 are conducted by the central processing section 3.

Figure 4C:
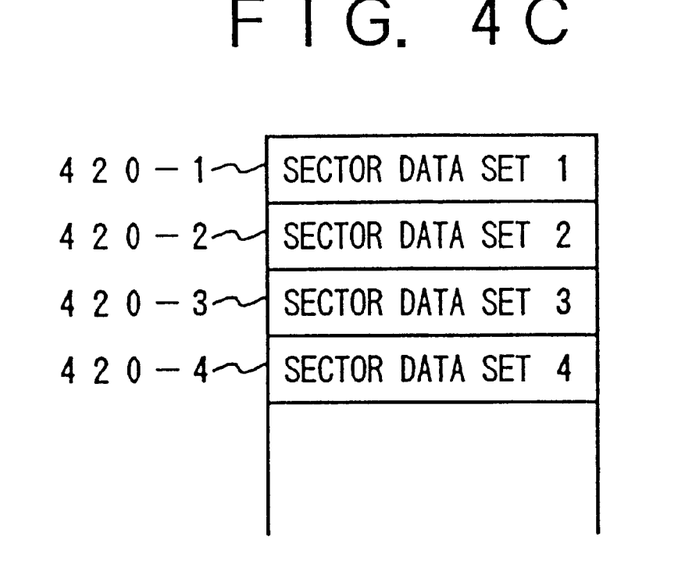

After the central processing section 3 finishes the error correction with respect to the first data set 410-1, the process shown in FIG. 3 is carried out with respect to the second data set 410-2. Since the error flag in the second data set 410-2 is "0 (zero)," in the processing shown in FIG. 3 with respect to this data set, the central processing section 3 determines "No" in the step 303, which causes the sector data set in the second data set 410-2 to be stored in the specified memory area. As in the processing with respect to the second data set, in the processing shown in the FIG. 3 with respect to the third and fourth data sets, sector data sets in the third and fourth data sets are stored in the specified memory area. In other words, since the error correction using the LECC is not carried out with respect to the second data set 410-2 to the fourth data set 410-4, the sector data sets in these data sets can be promptly stored in the specified memory area. FIG. 4C shows the first sector data set 420-1 to the fourth sector data set 420-4 stored in the specified memory area.

Figure 4D:
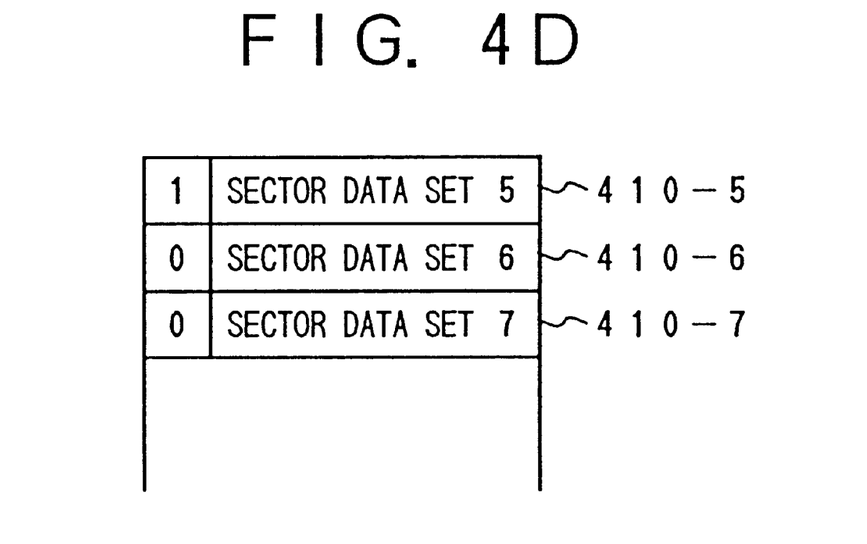

When the sector data sets shown in FIG. 4C have been stored in the specified memory area, the data sets 410-5 to 410-7 shown in FIG. 4D remain in the buffer memory.

During the execution period of the processing shown in FIG. 3, the sector data set can be transferred from the CD-ROM read control section 2 to the temporary buffer of the buffer memory 4. Thus, even if the error correction with respect to a particular sector data set is being carried out, other sector data sets provided by the CD-ROM read control section 2 are stored in the temporary buffer of the buffer memory 4, whereby the CD-ROM read control section 2 can continuously read the information recorded on the CD-ROM 1.

In addition, as described in connection with the step 202 of the FIG. 2, every time the sector data set obtained by the CD-ROM read control section 2 is to be stored in the temporary buffer, one or more space areas of one sector data are found and are secured as the temporary buffer. Accordingly, in this embodiment, since the size of the temporary buffer changes dynamically, the temporary buffer is not always a successive area. In view of the above, the central processing section 3 includes a memory management table to manage link information concerning areas of the temporary buffer and specified memory area with respect to the individual data sets including sector data sets.

Further, in this embodiment, the processing of the step 310 is not accomplished by actually transferring the sector data set stored in the temporary buffer to the specified memory area, but by rewriting the link information of the information management table. Accordingly, the time required to carry out the step 310 is very short. As a result it is possible to further reduce the processing time of the error correction. The freeing of the temporary buffer (steps 209, 208) is also accomplished by rewriting the link information of the information management table.

Since the specified memory area is established in the buffer memory 4 by rewriting the link information of the information management table, the specified memory area also changes dynamically and is not always a successive area.

Thus, since the temporary buffer 4 is used as the temporary buffer and the specified memory area, it is possible to reduce the memory capacity and the number of semiconductor memories.

The timing relationship between the reading of the information corresponding to the sector data set from the CD-ROM, and the error correction using the LECC in the CD-ROM drive apparatus which is an embodiment of the present invention will now be explained with reference to FIG. 5.

As mentioned above, since the data obtained by the CD-ROM read control section 2 are transferred to the temporary buffer of the buffer memory 4 by the DMAC, the error correction by the central processing section 3 shown in FIG. 3 and the above mentioned transfer are carried out in parallel.

Figure 5:
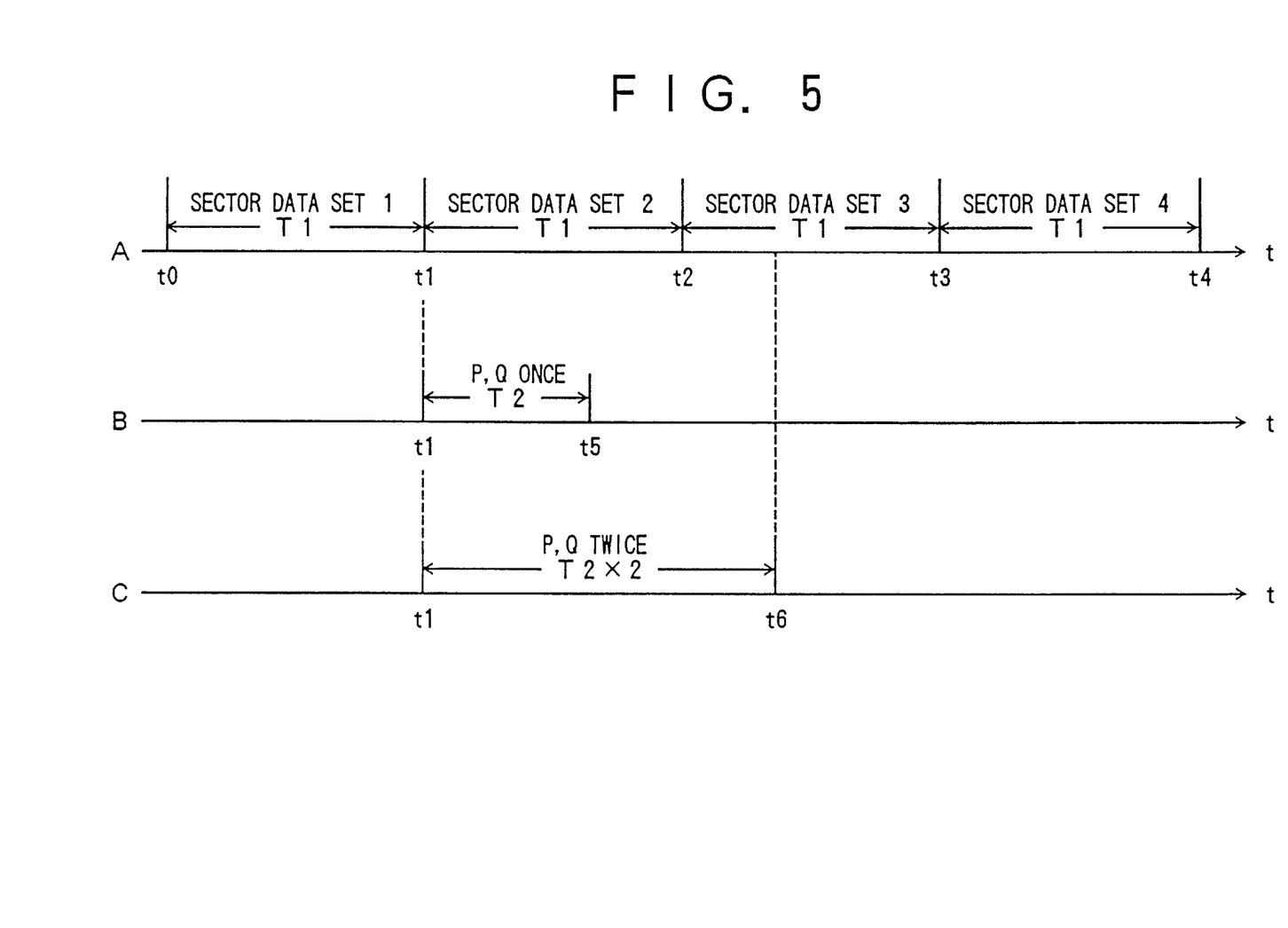
FIG. 5 shows a timing relationship between reading of a sector data set and error correction using LECC.

FIG. 5 shows the timing of the transfer of the data by the DMAC and that of the error correction by the central processing section 3 when the information recorded on the CD-ROM 1 is read at double speed. On the time axis A in the FIG. 5, the time T1 required to read out from the CD-ROM 1 the information corresponding to one sector data set is approximately 6.7 milliseconds (150 sectors/sec). Now, assume the transfer of the first sector data set to the fourth sector data set to the temporary buffer of the buffer memory 4 by the DMAC finishes at t1 to t4, respectively.

If the first sector data set includes errors, namely, the error flag with respect to this sector data set is "1," the error correction using the LECC is activated at approximately t1. In this embodiment, supposing that the SH7034 microcomputer which is the CPU provided in the central processing section 3 operates at a clock speed of 20 MHz, it takes approximately 4.4 milliseconds to carry out the error correction by the parities P and Q in succession (see time T2 on the time axis B). In other words, the error correction by the central processing section 3 is completed by the time t2 at which the transfer of the second sector data set to the temporary buffer is completed, so far as the error correction by the parities P and Q is carried out successively. Accordingly, in the conventional CD-ROM drive apparatus to which the present invention is not applied, it is possible to continuously read the information recorded on the CD-ROM without causing the apparatus to go into pause status.

However, since it takes approximately 8.8 milliseconds to carry out the error correction by parities P and Q twice (see time T2×2 on the time axis C), the conventional CD-ROM drive apparatus to which the present invention is not applied has to suspend reading of the information and go into the pause status.

On the contrary, in the CD-ROM drive apparatus which is an embodiment of the present invention, since the sector data sets are transferred to the temporary buffer of the buffer memory 4 to be stored therein independently of the error correction using the LECC by the central processing section 3, the apparatus need not enter the pause status even if the error correction using the LECC is carried out several times. As a result, it is possible to prevent a time loss from occurring owing to the CD-ROM drive apparatus being put in the pause status and then activated again to initiate reading of the information.

In view of the above, according to this embodiment, even if the error correction with respect to a particular sector data set is not completed before the reading of the information corresponding to a subsequent sector data set is completed, the subsequent data set from the CD-ROM read control section 2 is buffered, whereby the reading of the information recorded on the CD-ROM can be prevented from being suspended. In this embodiment, the buffer memory 4 is capable of storing data of 200 sectors (approximately 470 K bytes). In addition, the error rate of random byte errors is extremely small. Consequently, there is very little risk of the buffer memory 4 overflowing with data.

Figure 6:
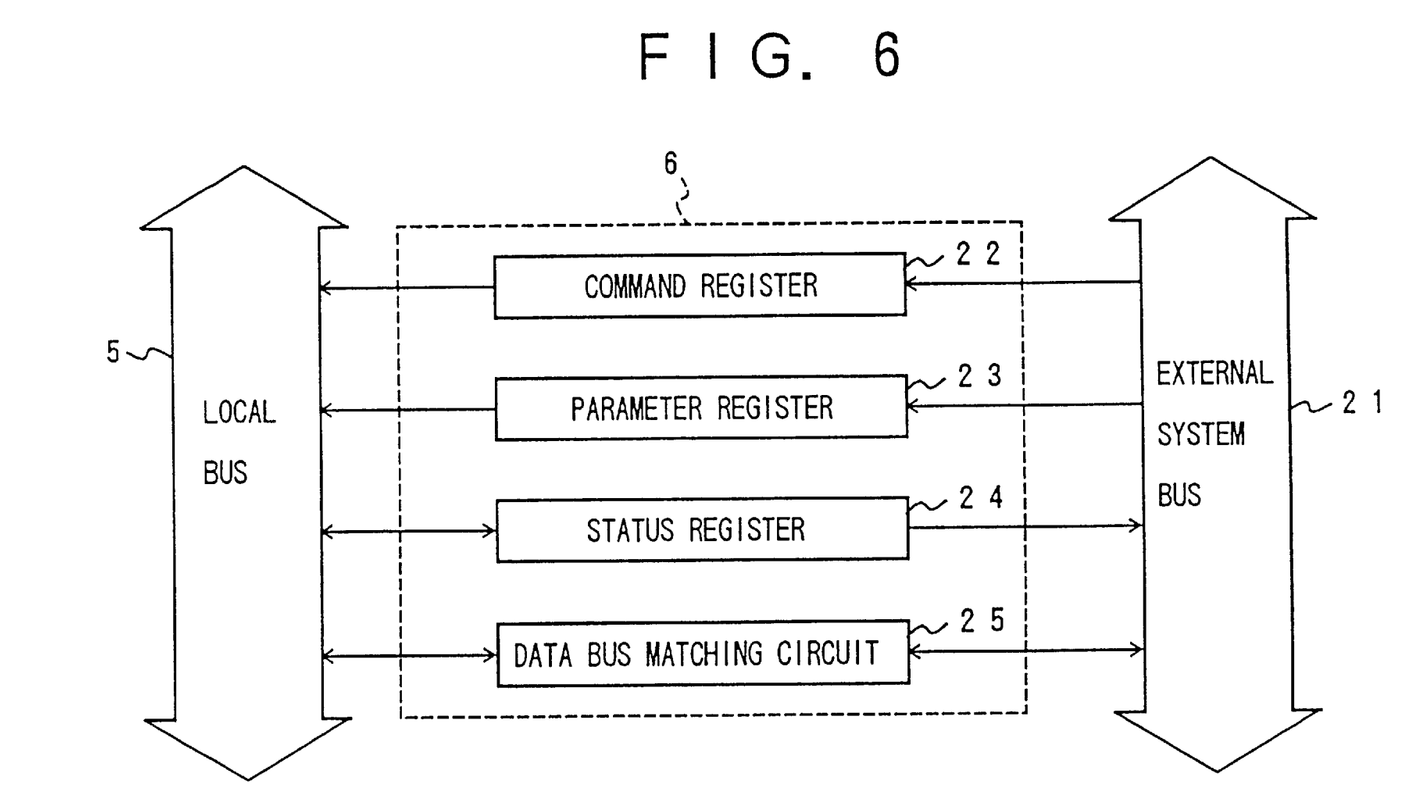
FIG. 6 is a schematic block diagram of a bus interface section according to a first embodiment of the present invention.

The detailed configuration of the bus interface section 6 will now be explained. As shown in FIG. 6, the bus interface 6 includes a command register 22 for storing data transfer requests or the like received from the external system 7 via the external system bus 21, a parameter register 23 for storing information accompanying the information supplied to the command register 22, a status register 24 for storing information indicative of the operational status of the CD-ROM drive apparatus, and a data bus matching circuit 25 which transforms data in the local bus 5 and in the external bus 21 into data adapted to each other.

In the thus-configured bus interface section 6, the data transfer request is supplied via the external system bus 21 to the command register 22 and stored therein. If there exists a control parameter accompanying the data transfer request, it is supplied via the external system bus 21 to the parameter register 23 to be stored therein.

The central processing section 3 reads the contents of the command register 22. If the accompanying parameter is required, the central processing section 3 reads the contents of the parameter register 23 to obtain the control parameter.

The operational status of the CD-ROM drive apparatus is supplied to the status register 24 by the central processing section 3, and is further transferred via the external system bus 21 to the external system 7.

Two types of operational status are established, one of which is a hardware status generated by logic circuits and the other of which is a software status managed by software of the central processing section 3. Since the hardware status is automatically generated by the logic circuit, if it changes, the central processing section 3 has to read it to determine the contents thereof. On the contrary, since the software status is stored in a register in the central processing section 3, during the execution period of the software by the central processing section 3, it suffices to write the software status into the status register 24 only when it changes.

One or more sector data sets after error correction by the central processing section 3 or data sets not subjected to the error correction by the central processing section 3 because they contain no error, which are read out from the specified memory area of the buffer memory 4, are supplied via the local bus 5 to the data bus matching circuit 25. The data bus matching circuit 25 converts the supplied data into data adapted to the external bus 21 and transfers the latter to the external system 7 via the external bus 21.

If the bus interface section 6 is configured to transfer the control parameter to the central processing section 3 via the data bus matching circuit 25, the parameter register can be eliminated.

Further, it is apparent that a general interface adapted to Small Computer System Interface (SCSI) standard, General Purpose Interface Bus (GPIB), or the like can be used as the external interface section 6.

Figure 7:
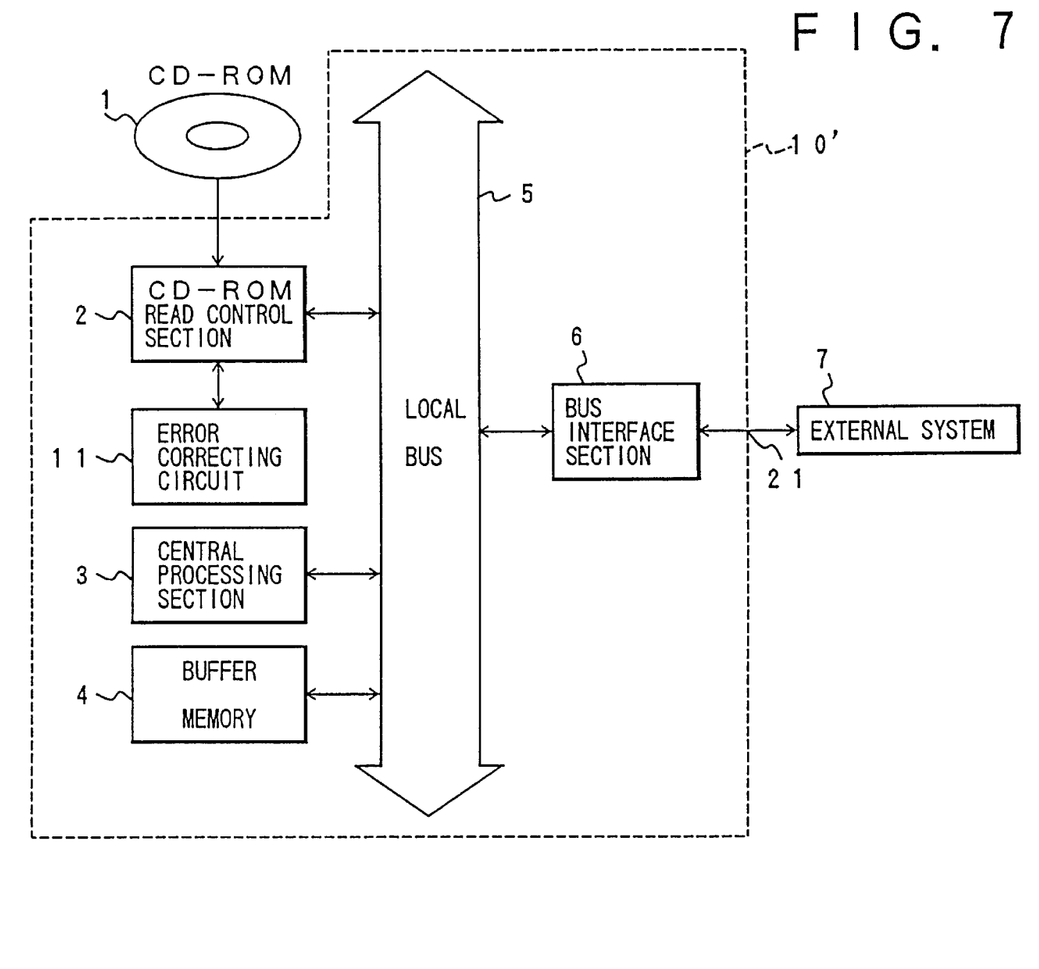
FIG. 7 is a schematic block diagram of a CD-ROM drive apparatus which is a second embodiment of the present invention and an external system.

The CD-ROM drive apparatus which is a second embodiment of the present invention will now be explained. As shown in FIG. 7, the structure of the CD-ROM drive apparatus 10' is analogous to that of the first embodiment except that it additionally includes an error correction circuit 11.

In the second embodiment, the error correction circuit 11 is constructed by hardware and includes a work memory (not shown) used for error correction. The error correction circuit 11 carries out the error correction using LECC with respect to sector data sets obtained by a CD-ROM read control memory 2. The time required to complete the error correction with respect to one sector data set is constant, and is less than the time required to read out information corresponding to one sector data set from a CD-ROM 1.

The sector data set obtained by the CD-ROM read control memory 2 is temporarily stored in the work memory provided in the error correction circuit 11. Next the error correction using the LECC is carried out by the error correction circuit 11, whereafter the sector data set after error correction is transferred to a temporary buffer of a buffer memory 4. At this time, if the sector data set after error correction by the error detection circuit 11 contains any errors, an error flag with respect to the sector data set concerning the processing is set. The error flag is used for determining whether or not the central processing section 3 carries out the error correction using the LECC.

The second embodiment is different from the first embodiment in that the error correction using the LECC is preliminarily carried out by the error correction circuit 11 before the sector data set obtained by the CD-ROM read control section 2 is transferred to the temporary buffer of the buffer memory 4. The error correction circuit 11 need not have a high error correction capability. Since the structure of the error correction section 11 is therefore relatively simple, it can be easily designed and manufactured at a low cost. As mentioned above, since the error rate of random byte errors is very small, most of the errors can be corrected by the error correction circuit 11. Even if the sector data set contains so many errors that the error detection circuit 11 cannot completely correct them, since the central processing section 3 carries out the error correction using the LECC after the sector data set is transferred to the temporary buffer, lowering of the reliability of eventually obtained data is prevented. On the contrary, in the second embodiment, since the error correction circuit 11 can correct most of the errors, it is possible to reduce the error correction load using the LECC by the central processing section 3, which increases the time available for managing the CD-ROM drive apparatus by the central processing section 3.

The present invention has thus been shown and described with reference to specific embodiments. However, it should be noted that the present invention is in no way limited to the details of the described arrangements but changes and modifications may be made without departing from the scope of the appended claims.

For example, although in the above mentioned embodiments, the present invention is applied to correct errors within data obtained based on information recorded on a CD-ROM in a CD-ROM drive apparatus, it is instead possible to apply the present invention to correct errors within data obtained based on information from other information storage media such as an optical disk.

In this case, the optical pickup, the pickup drive device and the like of the CD-ROM read control section 2 may be modified.

Further, although in the above described embodiments, the central processing section 3 activates the processing shown in FIG. 3 if at least one sector data set exists in the temporary buffer of the buffer memory 4, and the error correction using the LECC is carried out if necessary, the invention is not limited to this arrangement. It is instead possible to determine when the error correction using the LECC is initiated based on the importance of other processing for controlling the CD-ROM drive apparatus and the time period required to complete the other processing.

Furthermore, although in the above described embodiments, space areas in the buffer memory 4 are secured as the temporary buffer or the specified memory area, the invention is not limited to this arrangement. It is instead possible to define areas used for the temporary buffer and the specified memory area in advance.

Moreover, in the present invention, the respective means need not necessarily be physical means and arrangements whereby the function of the respective means is accomplished by software fall within the scope of the present invention. In addition, the function of a single means may be accomplished by two or more physical means and the function of two or more means may be accomplished by a single physical means.

What is claimed is:

1. An error correcting apparatus comprising:

a storage medium read control unit which reads out a data set from an information storage medium which stores therein at least one data set consisting of data of a predetermined length and error correcting codes used for correcting errors within the data;

an error correction unit, connected to said storage medium read control unit, which carries out a first error correction with regard to the data set read out by said storage medium control unit;

a memory, connected to said error correction unit, which temporarily stores the data set to which said first error correction was carried out by said error correction unit; and a central processing unit connected to the storage medium read control unit, said error correction unit and said memory, which is configured to control them and to carry out a second error correction with regard to the data set read out by said storage medium control unit, wherein said central processing unit carried out, in a case where one or more errors exist in another data set already stored in said memory, said second error correction with regard to said another data set.

2. An error correcting apparatus in accordance with claim 1, wherein said central processing unit includes a direct memory access controller and said direct memory access controller transfers the data set from said error correction unit to said memory.

3. An error correcting apparatus in accordance with claim 1, wherein said central processing unit is configured to set an error flag corresponding to said data set, which indicates whether or not said data set contains an error, based on a result of said first error correction by said error correction unit, and, in a case where said another already stored in said memory is determined to contain an error according to said error flag to carry out said second error correction.

4. An error correcting apparatus in accordance with claim 1, further comprising a second memory which stores data sets after the error correction by said central processing unit and/or data sets not subjected to said second error correction by the central processing unit because they have been determined to contain no errors.

5. An error correcting apparatus in accordance with claim 4, wherein said central processing unit includes memory management means which manages a memory space including addressees of said first memory and those of said second memory, and is configured to have said memory management means assign areas in said first memory in which data sets after said second error correction by said central processing unit and/or data sets not subjected to said second error correction by the central processing unit because they have been determined to contain no errors are stored, to areas in said second memory.

6. An error correcting apparatus in accordance with claim 1, wherein said central processing unit, in the case where one or more errors exist in another data set already stored in at least said memory, transfers the data set to which said first error correction has been carried out by said error correction unit, from said error correction unit to said memory; and even if data sets are read out sequentially by said storage medium read control unit and said first error correction by said error correction unit has been completed with regard to the data sets, before said second error correction is completed, sequentially transfers said data set to said memory without interrupting reading out by the storage medium read control unit.

7. An error correcting apparatus in accordance with claim 1, wherein said first error correction and said second error correction are error corrections using LECC.

8. An error correcting apparatus in accordance with claim 7, wherein said central processing means is configured to, when the error correction is to be carried out, repeat said second error correction within a range of a predetermined number of times so that the data set contains no error.

9. An error correcting apparatus in accordance claim 1, wherein:

said storage medium read control unit further includes an additional error correction unit which corrects errors in the data set read out from said information storage medium, and is configured to carry out a third error correction using said additional error correction unit prior to said first error correction by said error correction unit.

10. An apparatus utilizing an information storage medium, comprising:

a storage medium read control unit which reads out a data set from an information storage medium which stores therein at least one data set consisting of data of a predetermined length and error correcting codes used for correcting errors within the data;

an error correction unit, connected to said storage medium read control unit, which carries out a first error correction with regard to the data set read out by said storage medium control unit;

a memory connected to said error correction unit, which temporarily stores the data set to which said first error correction was carried out by said error correction unit;

a central processing unit connected to said storage medium read control unit, said error correction unit and said memory, which is configured to control them and to carry out a second error correction with regard to the data set read out by said storage medium control unit; and an external interface connected to said central processing unit and said memory, and connectable to an external system, wherein:

said apparatus is configured to transfer the data set stored in said memory to the external system via said external interface, and said central processing unit carries out, in a case where one or more errors exist in another data set already stored in said memory, said error correction with regard to said another data set.

11. An apparatus in accordance with claim 10, wherein when said external interface is supplied with a request which indicates that one or more predetermined data sets are transferred to the external system, said central processing unit instructs to cause said storage medium read control unit to read said predetermined data sets in response to that request.

12. An apparatus in accordance with claim 10, wherein said central processing unit, in the case where another data set already stored in said memory includes an error, transfers the data set to which said first error correction has been carried out by said error correction unit, from said error correction unit to said storage unit; and even if data sets are read out sequentially by said storage medium read control unit and said first error correction by said error correction unit has been completed with regard to said data sets, before said second error correction is completed, sequentially transfers said data set to said memory without interrupting reading out by said storage medium read control unit.

13. An apparatus utilizing an information storage medium in accordance with claim 10, wherein said central processing unit includes a direct memory access controller and said direct memory access controller transfers the data set from said error correction unit to said memory.

14. An error correcting apparatus in accordance with claim 9, wherein:

said first error correction and said second error correction are error corrections using LECC; and said third error correction is an error correction using CIRC.

* * * * *